United States Patent
Lee et al.

(10) Patent No.: US 9,392,617 B2
(45) Date of Patent: Jul. 12, 2016

(54) WIRELESS BASE STATION AND METHOD OF PROCESSING DATA THEREOF

(71) Applicant: Electronics and Telecommunications Research Institute, Daejeon (KR)

(72) Inventors: Hoon Lee, Daejeon (KR); Seungjae Bahng, Daejeon (KR); Kyung Yeol Sohn, Daejeon (KR); Youn Ok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 707 days.

(21) Appl. No.: 13/673,159

(22) Filed: Nov. 9, 2012

(65) Prior Publication Data

US 2013/0121248 A1    May 16, 2013

(51) Int. Cl.
*H04J 3/00*        (2006.01)
*H04W 74/00*    (2009.01)
*H04W 88/08*    (2009.01)
*H04W 8/22*      (2009.01)

(52) U.S. Cl.
CPC ............ *H04W 74/00* (2013.01); *H04W 88/085* (2013.01); *H04W 8/22* (2013.01)

(58) Field of Classification Search
None
See application file for complete search history.

(56) References Cited

U.S. PATENT DOCUMENTS

| | | | | |
|---|---|---|---|---|
| 8,406,178 B2* | 3/2013 | Tan | .................. | H04B 10/25759 370/328 |
| 8,462,817 B2* | 6/2013 | Ketchum | ................ | H04L 29/06 370/389 |
| 8,780,717 B2* | 7/2014 | Brydon | ................ | H04N 19/196 370/235 |
| 8,897,225 B2* | 11/2014 | Lee | ........................ | H04W 40/06 370/235 |
| 2003/0018941 A1* | 1/2003 | Miyata | ................ | H03M 13/256 714/780 |
| 2007/0147488 A1* | 6/2007 | Han | ........................ | H03D 3/006 375/222 |
| 2007/0260959 A1* | 11/2007 | Sidi | ...................... | H03M 13/256 714/755 |
| 2010/0040372 A1 | 2/2010 | Gejbrowitz et al. | | |
| 2011/0034175 A1 | 2/2011 | Fong et al. | | |
| 2011/0182255 A1* | 7/2011 | Kim | .................... | H04W 88/085 370/329 |
| 2012/0176980 A1* | 7/2012 | Moon | ............... | H04W 72/1226 370/329 |
| 2013/0303150 A1* | 11/2013 | Li | ........................ | H04W 36/22 455/418 |
| 2013/0308626 A1* | 11/2013 | Feng | ..................... | H04J 3/0638 370/350 |
| 2014/0241315 A1* | 8/2014 | Niu | ..................... | H04L 67/1091 370/331 |
| 2014/0255034 A1* | 9/2014 | Huo | ................... | H04Q 11/0067 398/82 |
| 2014/0369305 A1* | 12/2014 | Lee | ..................... | H04W 88/085 370/329 |

* cited by examiner

*Primary Examiner* — Mounir Moutaouakil
(74) *Attorney, Agent, or Firm* — Nelson Mullins Riley & Scarborough LLP

(57) ABSTRACT

A clustering wireless base station includes a group digital processor including a plurality of digital units (DU) and a plurality of remote radio frequency units (RRU) that are connected to the group digital processor through a transport network and that are installed in each service target area. In this case, each DU includes a decoder that decodes upward data that is received from the each DU, and each RRU includes an encoder that encodes downward data from the each DU.

2 Claims, 5 Drawing Sheets

WIRELESS BASE STATION AND METHOD OF PROCESSING DATA THEREOF

CROSS-REFERENCE TO RELATED APPLICATION

This application claims priority to and the benefit of Korean Patent Application No. 10-2011-0117004 and 10-2012-0085899 filed in the Korean Intellectual Property Office on Nov. 10, 2011 and Aug. 6, 2012, the entire contents of which are incorporated herein by reference.

BACKGROUND OF THE INVENTION (a) Field of the Invention

The present invention relates to a wireless base station and a method of processing data thereof. More particularly, the present invention relates to a wireless base station and a method of processing data thereof in which a digital unit and a plurality of remote radio units of each base station are connected by a transport network.

(b) Description of the Related Art

A network speed becomes an important competitive element because of popularization of smart phones, and for this purpose, a cloud communication center (CCC) was introduced.

The CCC separates a digital unit (DU) and a remote radio unit (RRU) in one piece of equipment in an existing wireless base station and centralizes DUs in a separate DU center, and the RRU is installed in a service target area and is connected to an optical cable. Such a clustering wireless base station enables easy maintenance and minimizes an installation area of a wireless base station, thereby reducing facilities rental cost and power cost.

However, in a clustering wireless base station, because the RRU and the DU are connected through a transport network, data transmission of a relatively large amount to the transport network is requested. That is, because the DU performs modulation, demodulation, coding, and decoding, which are physical layer functions of a baseband modem, an amount of data that is exchanged between the DU and the RRU increases.

SUMMARY OF THE INVENTION

The present invention has been made in an effort to provide a wireless base station and a method of processing data thereof having advantages of reducing an amount of data that is transmitted/received through a transport network between an RRU and a DU.

An exemplary embodiment of the present invention provides a clustering wireless base station. The wireless base station includes: a group digital processor including a plurality of digital units (DU); and a plurality of remote radio frequency units (RRU) that are connected to the group digital processor through a transport network and that are installed in each service target area, wherein each DU includes a MAC function unit that performs a transmitting/receiving medium access control (MAC) function, and each RRU includes an encoder that encodes downward data from each DU.

Each DU may further include a decoder that decodes upward data that is received through an antenna.

Each RRU may further include a decoder that decodes upward data that is received through an antenna.

Each RRU may further include: a modulation unit that modulates the encoded data; an RF unit that converts the modulated data to an RF signal and that transmits the RF signal; and a demodulation unit that calculates a soft decision value or a hard decision value of upward data that is received through an antenna and that transports the calculated value to the group digital processor.

Another embodiment of the present invention provides a method of processing downward data in a clustering wireless base station including a group digital processor including a DU of each base station and a plurality of RRUs that are connected to the group digital processor through a transport network and that are installed in each service target area. The method includes transmitting, by the group digital processor, the downward data that receives from an upper level layer to at least one RRU of the plurality of RRUs through the transport network; encoding and modulating, by the at least one RRU, the downward data; and converting, by the at least one RRU, the encoded and modulated data to an RF signal and transmitting the RF signal through an antenna.

Yet another embodiment of the present invention provides a method of processing upward data in a clustering wireless base station including a group digital processor including a DU of each base station and a plurality of RRUs that are connected to the group digital processor through a transport network and that are installed in each service target area. The method includes receiving, by at least one RRU of a plurality of RRUs, the upward data through an antenna; calculating, by the at least one RRU, a soft decision value or a hard decision value of the upward data; and decoding, by at least one RRU or a corresponding DU, the upward data using the soft decision value or the hard decision value.

The decoding of the upward data may include transmitting, by the at least one RRU, the soft decision value or the hard decision value to the corresponding DU through the transport network, and decoding, by the corresponding DU, the upward data using the soft decision value or the hard decision value.

The decoding of the upward data may include decoding, by the at least one RRU, the upward data using the soft decision value or the hard decision value, and transmitting the decoded data to the corresponding DU through the transport network.

Yet another embodiment of the present invention provides a clustering wireless base station. The wireless base station includes: an encoder that is connected to a plurality of DUs through a transport network and that encodes downward data from each DU encoder; a modulation unit that modulates the encoded data; an RF unit that converts the modulated data to an RF signal and that transmits the RF signal; and a demodulation unit that calculates a soft decision value or a hard decision value of upward data that is received through an antenna and that transports the calculated value to at least one of a plurality of DUs.

DETAILED DESCRIPTION OF THE EMBODIMENTS

Figure 1:
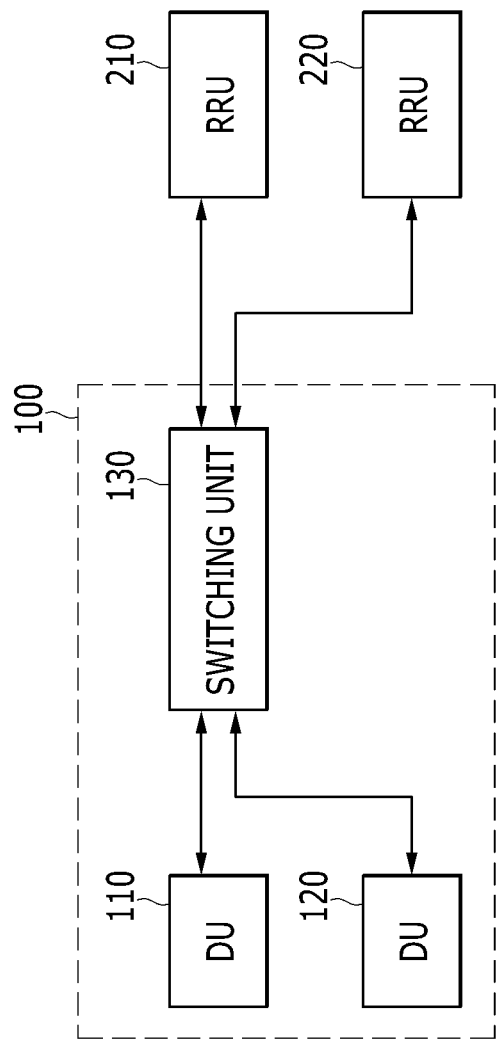
FIG. 1 is a block diagram illustrating a clustering wireless base station according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a wireless base station and a method of processing data thereof according to an exemplary embodiment of the present invention will be described in detail with reference to the drawings.

FIG. 1 is a block diagram illustrating a wireless base station according to an exemplary embodiment of the present invention.

Referring to FIG. 1, the wireless base station includes a group digital processor 100 and a plurality of RRUs 210 and 220 that are connected to the group digital processor 100 by a transport network.

The group digital processor 100 is installed at a digital center. The group digital processor 100 includes a plurality of DUs, for example, DUs 110 and 120, and a switching unit 130.

That is, by centralizing DUs 110 and 120 of several base stations at one group digital processor 100, the several base stations can be used like one wireless base station.

The DUs 110 and 120 perform a digital signal processing and a medium access control (MAC) function.

The switching unit 130 switches upward and downward data that are transmitted/received between the group digital processor 100 and the RRUs 210 and 220.

The RRUs 210 and 220 are installed in respective service target areas, and are connected to the group digital processor 100 through a transport network such as a coaxial cable, an optical cable, and microwaves.

In general, the RRUs 210 and 220 only perform an RF function of amplifying an RF signal and transmitting the amplified RF signal through an antenna.

However, the RRUs 210 and 220 according to an exemplary embodiment of the present invention perform a physical layer function of a baseband modem such as modulation, demodulation, encoding, and decoding as well as an RF function. In this case, a decoding function of physical layer functions of a baseband modem may be performed in the DUs 110 and 120.

Such a wireless base station enables easy maintenance and minimizes an installation area of a wireless base station, thereby reducing facilities rental cost and power cost, and as the RRUs 210 and 220 perform a physical layer function of a baseband modem, an amount of data that is exchanged between the RRUs 210 and 220 and the DUs 110 and 120 through a transport network can be reduced.

Figure 2:
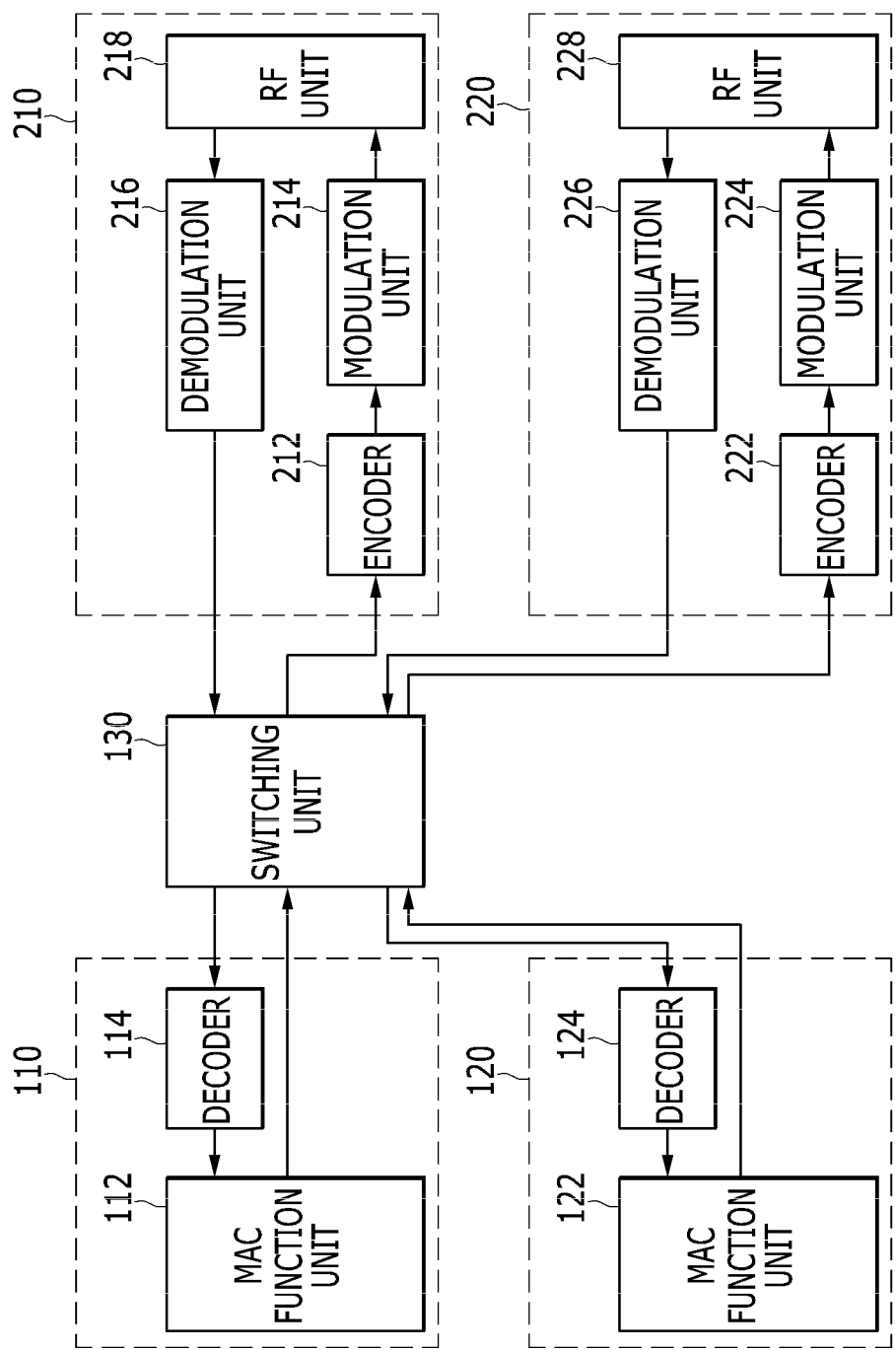
FIGS. 2 and 3 each are block diagrams illustrating a detailed configuration of the wireless base station that is shown in FIG. 1.
Figure 3:
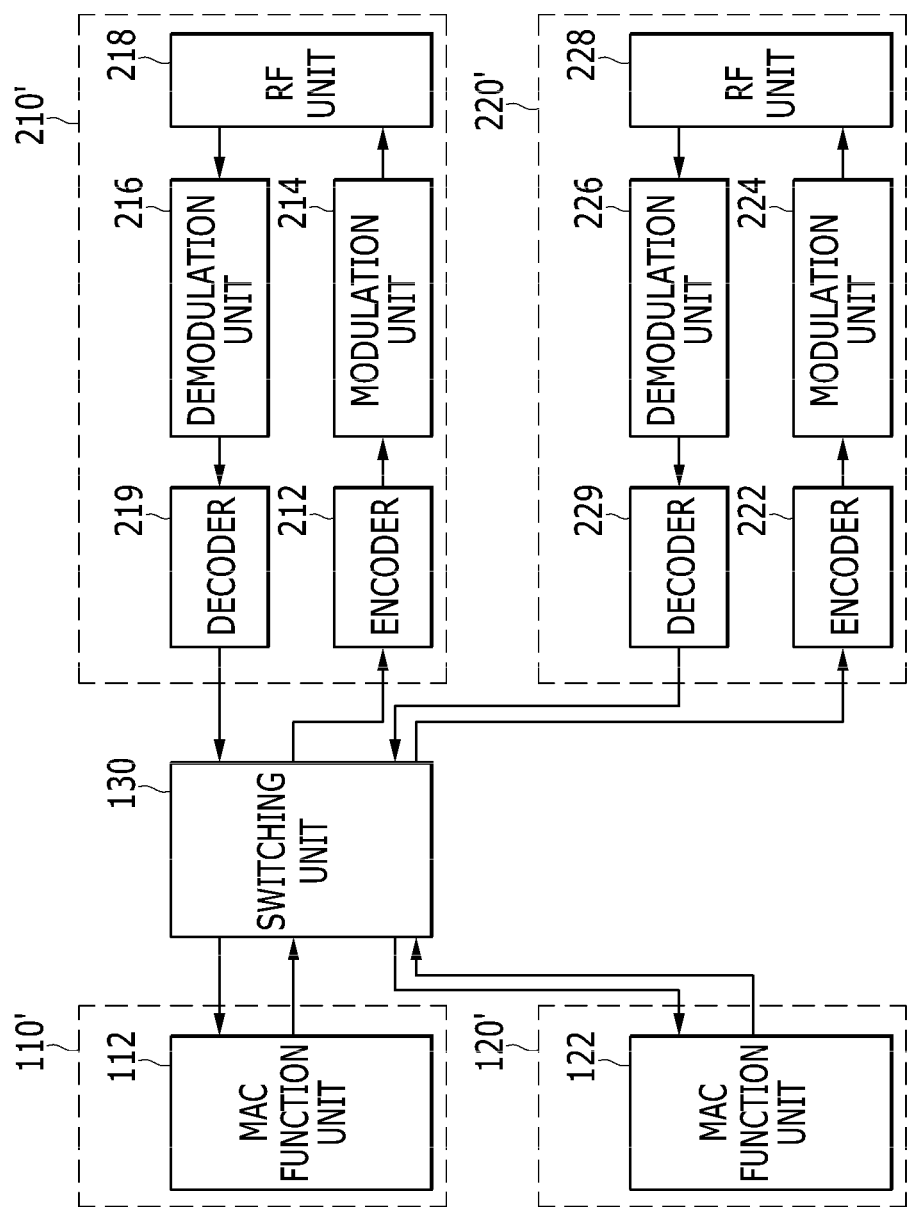

FIGS. 2 and 3 each are block diagrams illustrating a detailed configuration of the wireless base station that is shown in FIG. 1.

Referring to FIG. 2, the DUs 110 and 120 of the group digital processor 100 according to an exemplary embodiment of the present invention include MAC function units 112 and 122 and decoders 114 and 124, respectively. The MAC function units 112 and 122 perform a transmitting/receiving MAC function of a base station.

The decoders 114 and 124 decode upward data using a soft decision or hard decision value of upward demodulation data that are received from the RRUs 210 and 220, and transport the decoded data to the MAC function units 112 and 122. In this case, a typical soft decision method is a method of using a log likelyhood ratio (LLR).

Particularly, the decoders 114 and 124 decode a soft decision value or a hard decision value of upward data that are received from the RRUs 210 and 220, respectively, and transport the decoded value to the MAC function units 112 and 122, respectively, according to a receiving operation method. Alternatively, the decoders 114 and 124 couple and decode a soft decision value or a hard decision value of the upward data that is received from the RRUs 210 and 220 and transport the decoded value to the MAC function units 112 and 122, respectively.

The RRUs 210 and 220 includes encoders 212 and 222, modulation units 214 and 224, demodulation units 216 and 226, and RF units 218 and 228, respectively. Although not shown in FIG. 1, the RRUs 210 and 220 may further include a module (not shown) that performs a function of encoding and decoding, which are physical layer functions of a baseband modem. Further, the RRUs 210 and 220 may further include a digital-to-analog converter (not shown) and an analog-to-digital converter (not shown) of a baseband modem between the modulation units 214 and 224 and the RF units 218 and 228 and between the RF units 218 and 228 and a demodulation unit.

The encoders 212 and 222 encode downward data that is output from the MAC function units 112 and 122 of the group digital processor 100 and output the encoded data to the modulation units 214 and 224.

The modulation units 214 and 224 modulate the encoded data according to a determined modulation method and output the modulated data to the RF units 218 and 228, respectively, and the RF units 218 and 228 convert and amplify the modulated data to an RF signal and transmit the RF signal through an antenna.

Further, the RF units 218 and 228 transport upward data that is received through an antenna to the demodulation units 216 and 226, respectively, and the demodulation units 216 and 226 demodulate the upward data and transmit the demodulated data to the group digital processor 100. In this case, the demodulation units 216 and 226 calculate a soft decision value or a hard decision value of the upward data and transport the calculated value to the group digital processor 100.

Referring to FIG. 3, DUs 110' and 120' of a wireless base station according to another exemplary embodiment of the present invention include only MAC function units 112 and 122, respectively, unlike FIG. 2 according to an operation method, and RRUs 210' and 220' may further include decoders 219 and 229, respectively. In this case, the decoders 219 and 229 decode upward data using a decision value of the upward data that receives from demodulation units 216 and 226 and transport the decoded data to the MAC function units 112 and 122, respectively. In this way, as the encoders 212 and 222 are positioned at the RRUs 210' and 220', the modulated data does not pass through a transport network, and the decoders 219 and 229 are positioned at the DUs 110' and 120' according to an operation method, and a decision value is input to the decoders 219 and 229 through a transport network, or the decoders 219 and 229 are positioned at the RRU 210' and 220', and as the decoded value is input to the MAC function units 112 and 122 through a transport network, an amount of data that is exchanged between the RRUs 210' and 220' and the DUs 110' and 120' can be remarkably reduced, compared with a conventional clustering wireless base station.

In downward data transmission, for example, an amount of data that is input from the MAC function units 112 and 122 to the encoders 212 and 222 become double while passing through the encoders 212 and 222 (double in a coding rate 0.5), and data necessary for forming a wireless transmission frame is added (a preamble, a pilot signal), and in a signal processing process, a case of specifically expressing (in consideration of a 14 bit digital-to-analog converter, in order to transmit to 1 bit data, 14 bits are used) 1 bit data with accuracy of a digital-to-analog converter is performed.

Therefore, when the RRUs 210' and 220' perform a physical layer function of a baseband modem, an amount of data that is transmitted through a transport network can be reduced further than that when the DUs 110' and 120' perform a physical layer function of a baseband modem. In a modulation process, an entire transmission data amount can be somewhat reduced when using a modulation method such as 64-QAM.

Table 1 shows a difference between a data amount that is transmitted to an RRU according to an exemplary embodiment of the present invention and a data amount that is transmitted to an RRU of an existing base station through a transport network based on WiBro-Adv. and LTE-Adv. specifications, which are 4th generation mobile communication technology.

TABLE 1

| Specification | | WiBro-Adv. | LTE-Adv. |
|---|---|---|---|
| Duplexing | | TDD | FDD |
| Bandwidth (DL/UL, MHz) | | 20 | 20/20 |
| FFT Size | | 2048 | 2048 |
| CP Size | | 256 | 144 |
| Samples/OFDMA Symbol | | 2304 | 2192 |
| ADC/DAC Resolution (bits) | | 14 | 14 |
| MIMO (DL/UL) | | 4 × 4 | 4 × 4/1 × 4 |
| Frame Duration (ms) | | 20 | 10 |
| OFDMA symbols/Frame | | 188 | 140 |
| Max. Data Rate (DL/UL, Mbps/Sector) | | 150/50 | 326/86 |
| Sectors/Base Station | | 3 | 3 |
| Transport network transmission data amount | Existing RRH base station | 7.2 Gbps | 13 Gbps |
| | Base station according to the present invention | 0.6 Gbps | 1.24 Gbps |

Table 1 shows that a transport network transmission data amount is remarkably reduced, compared with an existing case.

Figure 4:
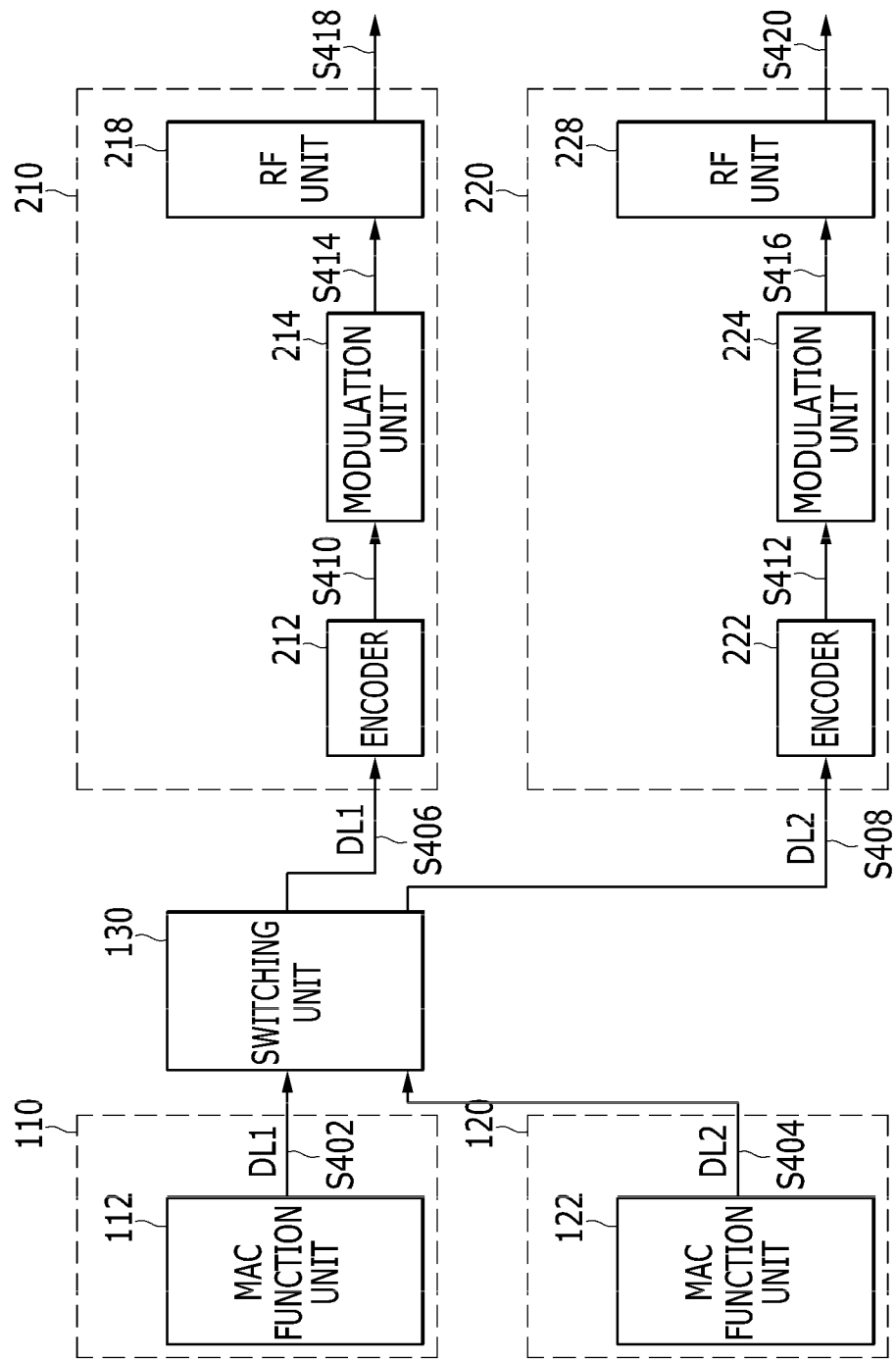
FIG. 4 is a block diagram illustrating an example of a method of processing downward data of a wireless base station according to an exemplary embodiment of the present invention.

FIG. 4 is a block diagram illustrating an example of a method of processing downward data of a wireless base station according to an exemplary embodiment of the present invention.

Referring to FIG. 4, the MAC function units 112 and 122 of each base station transport downward data DL1 and DL2 that are received from an upper level layer to the switching unit 130 (S402 and S404).

When the switching unit 130 receives the downward data DL1 and DL2 from the MAC function units 112 and 122, the switching unit 130 switches the downward data DL1 and DL2 to the RRUs 210 and 220, respectively (S406 and S408).

When the encoders 212 and 222 of the RRUs 210 and 220 receive the downward data DL1 and DL2, respectively, the encoders 212 and 222 encode the downward data DL1 and DL2 and output the encoded data to the modulation units 214 and 224 (S410 and S412).

The modulation units 214 and 224 modulate the encoded data with a determined modulation method (S414 and S416), and the RF units 218 and 228 convert and amplify the modulated data to an RF signal and transmit the RF signal through an antenna (S418 and S420).

Hereinafter, a method of processing data of a wireless base station based on a wireless base station of FIG. 2 will be described with reference to FIGS. 4 and 5.

Figure 5:
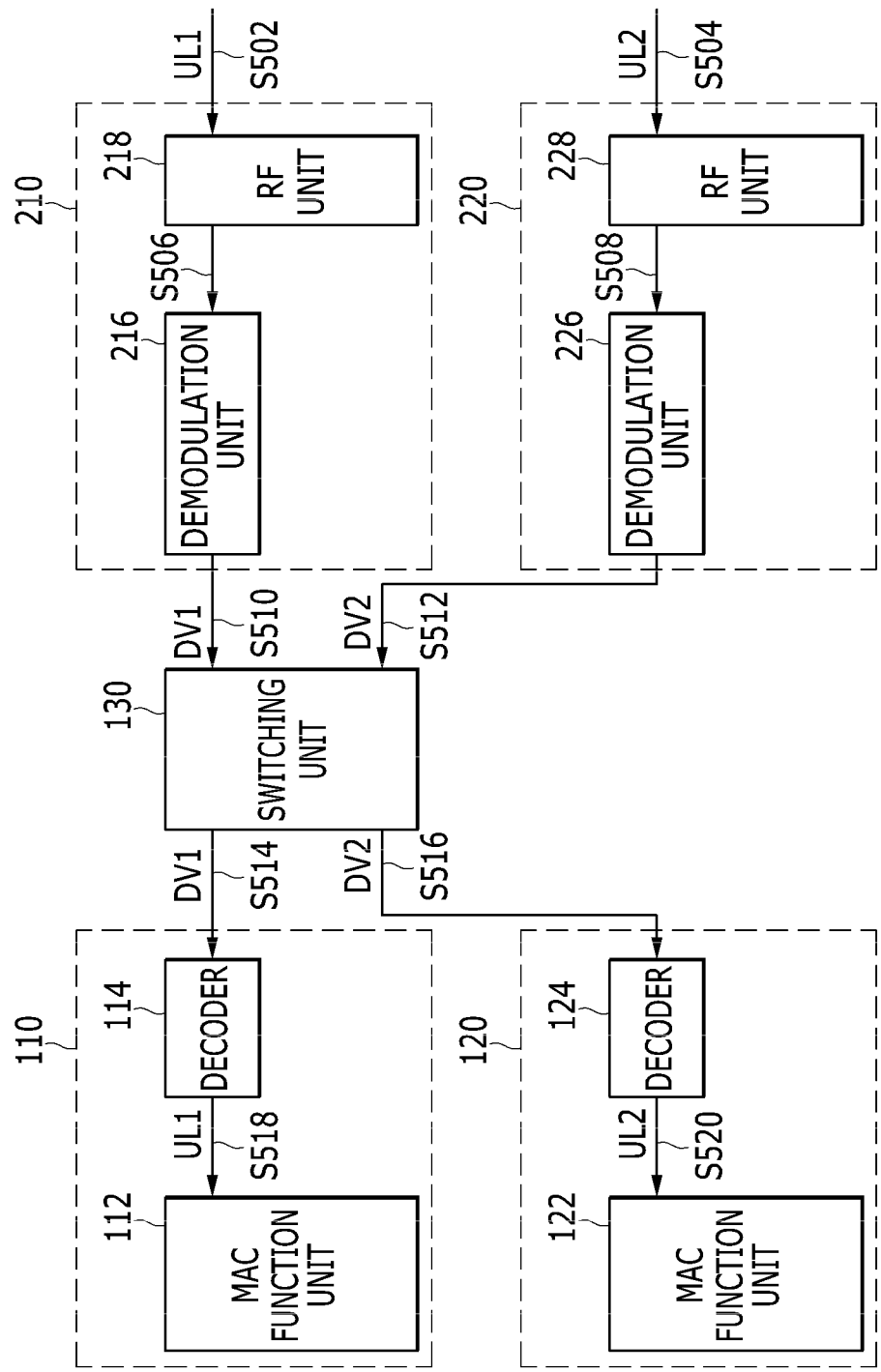
FIG. 5 is a block diagram illustrating an example of a method of processing upward data of a wireless base station according to an exemplary embodiment of the present invention.

FIG. 5 is a block diagram illustrating an example of a method of processing upward data of a wireless base station according to an exemplary embodiment of the present invention.

Referring to FIG. 5, when the RF units 218 and 228 of the RRUs 210 and 220 receive upward data UL1 and UL2, respectively, from an antenna (S502 and S504), the RF units 218 and 228 transport the received upward data UL1 and UL2 to the demodulation units 216 and 226, respectively (S506 and S508). In this case, the upward data that is received from the antenna is converted to a baseband signal, is converted to a digital signal through analog-digital conversion, and is transported to the demodulation units 216 and 226.

The demodulation units 216 and 226 calculate hard decision values or soft decision values DV1 and DV2 of the upward data that is converted to a digital signal, and transmit the calculated decision values DV1 and DV2 to the switching unit 130 through a transport network (S510 and S512). The switching unit 130 transports the decision values DV1 and DV2 of the received upward data to the corresponding decoders 114 and 124 (S514 and S516).

The decoders 114 and 124 decode upward data using the decision values DV1 and DV2 of the upward data and transport the decoded data UL1 and UL2 to the MAC function units 112 and 122, respectively (S518 and S520). In this case, the decision values DV1 and DV2 of the upward data may be transported to one decoder, for example, the decoder 114, and when the decision values DV1 and DV2 are soft decision values, the decoder 114 couples and decodes the decision values DV1 and DV2 from the RRUs 210 and 220. That is, only when the soft decision value is used, soft decision values that are transmitted from the two or more RRUs 210 and 220 can be combined and decoded.

In a wireless base station such as FIG. 3, the decoders 114 and 124 couple and decode soft decision values or hard decision values of upward data that is received from the RRUs 210 and 220, respectively, and transport the decoded value to the MAC function units 112 and 122, respectively, through a transport network.

The MAC function units 112 and 122 perform a MAC processing of the decoded data UL1 and UL2, respectively, and transport the data to an upper level layer.

The MAC function units 112 and 122 illustrate that one base station MAC is formed with one block, but do not exclude a virtual configuration in which at least one MAC function is embodied with software in one hardware platform.

The switching unit 130 may be connected to the MAC function units 112 and 122 that are physically formed with at least one piece of hardware and may be connected to at least one virtual base station MAC function unit (not shown) that is physically formed with one piece of hardware. When the switching unit 130 is connected to at least one of RUs 210 and 220, the switching unit 130 and the RRUs 210 and 220 support a respective physical connection of 1:1. Further, the switching unit 130 may be connected to at least one of RRUs 210 and 220 through a single transport network medium using a transport network transmission method such as a time division transmission method (TDM), a frequency division transmission method (FDM), frequency overlay, and a light wave division transmission method (WDM).

According to an exemplary embodiment of the present invention, when embodying a clustering wireless base station, by enabling an RRU that is installed at a remote location to perform a physical layer function of a baseband modem, an amount of data that is transmitted/received through a transport network between the RRU and a DU can be reduced.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clustering wireless base station, comprising:
a group digital processor comprising a plurality of digital units (DUs); and
a plurality of remote radio frequency units (RRUs) that are connected to the group digital processor through a transport network, wherein the plurality of RRUs are installed in each service target area,
wherein each of the plurality of RRUs comprises:
an encoder that is connected to the plurality of DUs and that encodes downward data from each DU encoder;
a modulation unit that modulates the encoded data;
an radio frequency (RF) unit that converts the modulated data to an RF signal and that transmits the RF signal;
a demodulation unit that calculates a soft decision value or a hard decision value of upward data that is received through an antenna and that transports the calculated value to at least one of the plurality of DUs; and
a decoder that decodes the soft decision value or the hard decision value of the upward data and that transports the decoded value to the at least one DU through the transport network.

2. The wireless base station of claim 1, wherein the demodulation unit transports the soft decision value or the hard decision value through the transport network to the at least one DU.

* * * * *